Sept. 22, 1936.   G. E. BROCK ET AL   2,055,194
TRENCHING PLOW
Filed Nov. 18, 1935
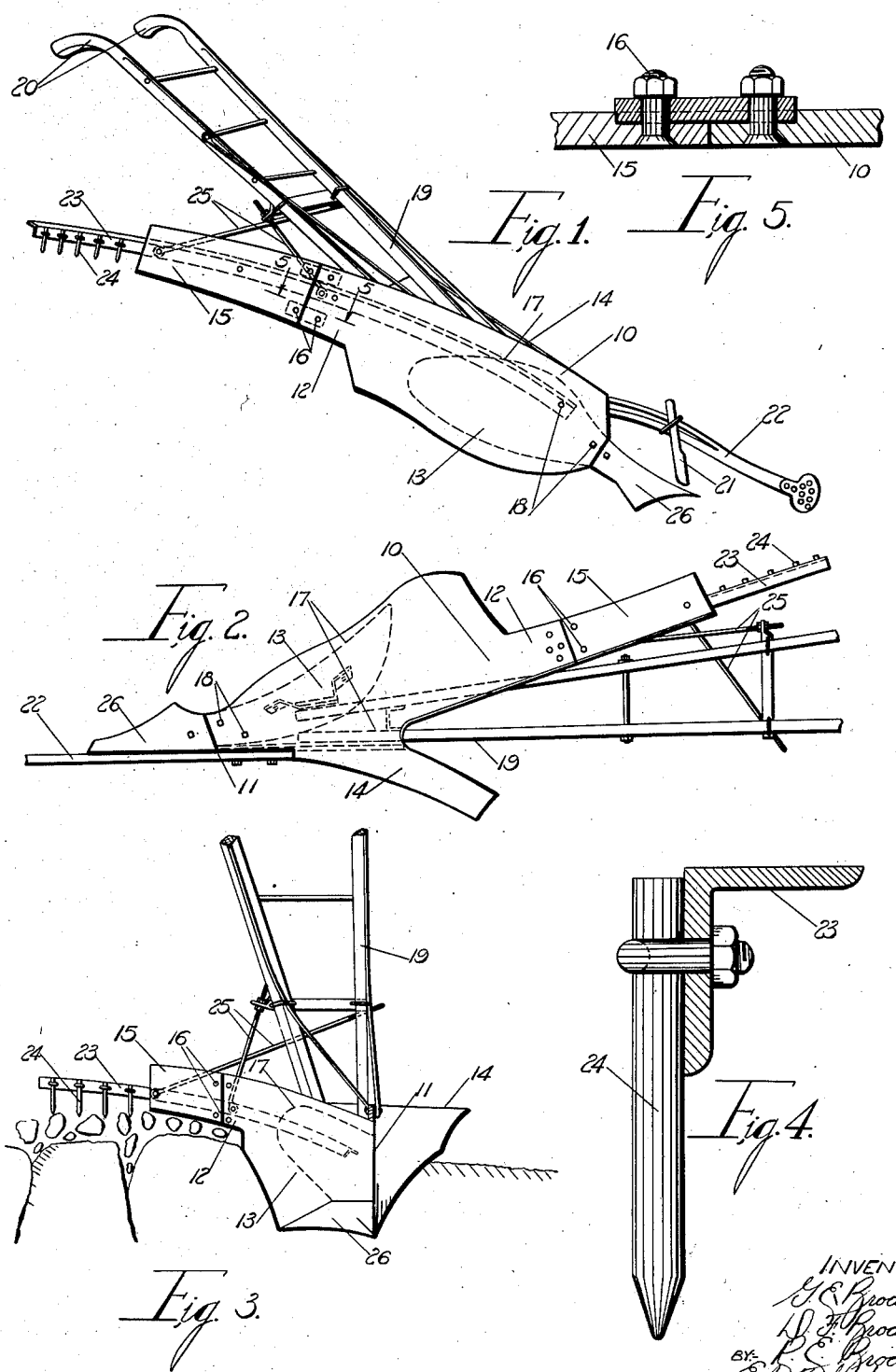

Patented Sept. 22, 1936

2,055,194

UNITED STATES PATENT OFFICE 2,055,194

TRENCHING PLOW

George Edward Brock, Daniel Forster Brock, and Robert Elliott Brock, Simcoe, Ontario, Canada Application November 18, 1935, Serial No. 50,274

5 Claims. (Cl. 97—55)

The invention relates to a trenching plow, as described in the present specification and illustrated in the accompanying drawing which forms a part of the same.

The invention consists essentially of the novel features of construction pointed out broadly and specifically in the claims for novelty following a description in detail of an acceptable form of the invention.

The objects of the invention are to combine the cutting for a ditch with the plowing operations and to facilitate the work of farmers and others in trimming and draining fields from the improvement of their arable lands and at the same time effecting economy in so far as time is concerned, especially as the ditches are made during the busiest season of the year; to construct a device which may be used as an attachment to an ordinary plow without much alteration in the matter of assembly and thereby increase the value of a plow and enlarge its uses; to form rounded edges to a ditch and level off the adjacent land, thereby avoiding the common danger of damages to farm implements through wheel or axle breakages caused by the sudden drop into the deep furrows which form the drainage for the field; to furnish a trenching plow capable of being utilized for road building as well as a ditcher; and generally to provide a trenching plow which will form deep furrows and round off the edges thereof and smooth out the earth therearound and which will not require any experience in handling and be efficient for the purpose set forth and capable of several uses of a similar nature.

In the drawing:

Figure 1 is a perspective view of the trenching plow.

Figure 2 is a plan view of the trenching plow.

Figure 3 is a front perspective view of the trenching plow in operation.

Figure 4 is an enlarged detail of one of the harrow teeth and its fastening.

Figure 5 is a fragmentary sectional view of one form of fastening the mould boards together.

Like numerals of reference indicate corresponding parts in the various figures.

Referring to the drawing, the trenching plow as shown is formed as an attachment to an ordinary plow but it is of course understood that the trenching plow may be formed as a plow by itself in place of being an attachment.

The trench member is formed of a supplemental mould board as indicated by the numeral 10 having the knife 11 and the tail 12. This supplemental mould board is formed with a bulge 13 and has on its opposite side a wing mould board 14 which is so shaped as to round off the ditch wall during the progress of the plow in its operation and an auxiliary mould board 15 is fastened to the tail portion 12 of the supplemental mould board 10 by means of the bolts 16.

This supplemental mould board 10 and its wing board 14 overlie and are fastened to the inner mould board 17 which forms a part of the ordinary plow, and the means for fastening are simply accomplished by means of the bolts 18 which extend through the mould board 17, the mould board 17 being fastened in the usual way to the frame 19 which includes the handle bars 20, and the frame has the usual coulter 21 and beam 22.

The harrow 23 having the teeth 24 is supported by the handle bar frame 19 by means of the connections 25 and is for the purpose of smoothing off the earth on the land side as the plow is being pulled along, in making its furrows or ditch.

It will therefore be seen that this device really consists of a mould board which has a wing projecting to one side of its main portion so that a V is formed which is secured to the plow proper or to a structure, the main portion being curved so as to provide a wider sweep for the turned up earth and which can be swept further out through the extension member which forms the tail of the mould board.

The wing member forms the shaping of the ditch wall, in other words, it cuts off the sharp corners thereof and provides a gradual slanting sweep of the ditch wall so that not only is the ditch widened to the proper width but it provides an easy access or exit for the farm implements which are used on the field, such as a binder which is of special value in eliminating the danger of breakages to the axle owing to the sharp drop of the wheels into an ordinary made ditch, while in the use of this invention through the slanting walls, by the cutting off of the sharp edges the wheels will just naturally glide down the ditch wall and out again and avoid any jar to the implement.

What we claim is:

1. A trenching plow comprising a frame having an inner mould board secured thereto, a shear secured to said inner mould board, an outer mould board having a wing mould board extending laterally therefrom mounted over and secured to said inner mould board through bolts, a tail member fastened to said outer mould board by bolts and a harrow adapted to be secured to the frame.

2. A trenching plow comprising a frame formed of an inner mould board and an outer V shaped mould board, said outer mould board mounted over said inner mould board and removably attached thereto and having greater lateral dimensions than a furrow width for levelling off the overturned earth, handle bars extending rearwardly therefrom secured to said inner mould board for guiding the said plow, and a shear for entering into the earth secured to said inner mould board.

3. In a trenching plow having a beam, a frame formed of an inner mould board, an outer V shaped mould board having flaring ends of greater lateral dimensions than a furrow width adapted to level off the overturned earth mounted over said inner mould board and removably attached thereto, handle bars extending rearwardly therefrom suitably secured to said inner mould board, a cross piece secured to said handle bars, diagonal braces secured to said cross piece and to said outer mould board, and a shear for entering into the earth secured to said inner mould board.

4. In a trenching plow comprising a frame formed of an inner mould board, a beam extending forwardly therefrom adapted to support a coulter, an outer mould board mounted over said inner mould board removably attached thereto, said outer mould board having greater lateral dimensions than a furrow width adapted in its passage to round off the sharp corner of the land side of the furrow and to level off the overturned earth of the furrow on the crowned side, and a harrow suitably secured to the rear portion of the outer mould board for scattering lumps deflected off the end of said outer mould board, handle bars extending rearwardly for guiding the said plow, and a shear for breaking into the earth secured to the said inner mould board.

5. In a trenching plow comprising a frame formed of an inner mould board, a beam extending forwardly therefrom adapted to support a coulter, an outer irregular V shaped mould board having an upstepped flaring end projecting laterally a greater distance than the other and having a harrow suitably secured thereto for levelling lumps deflected from the said upstepped flaring end, said harrow having removable teeth, a shear secured to the said inner mould board, handles extending rearwardly for guiding the said plow, said coulter and said shear adapted to enter and cut the earth.

GEORGE EDWARD BROCK.
DANIEL FORSTER BROCK.
ROBERT ELLIOTT BROCK.